(12) United States Patent
Brauer

(10) Patent No.: US 10,490,983 B2
(45) Date of Patent: Nov. 26, 2019

(54) CORONA DISCHARGE CELLS

(71) Applicant: BRAUER INTERNATIONAL PTY LTD, Nerang (AU)

(72) Inventor: John Lionel Brauer, Nerang (AU)

(73) Assignee: BRAUER INTERNATIONAL PTY LTD, Nerang (AU)

(*) Notice: Subject to any disclaimer, the term of this patent is extended or adjusted under 35 U.S.C. 154(b) by 171 days.

(21) Appl. No.: 15/323,309

(22) PCT Filed: Jul. 1, 2015

(86) PCT No.: PCT/AU2015/050368
§ 371 (c)(1),
(2) Date: Dec. 30, 2016

(87) PCT Pub. No.: WO2016/000038
PCT Pub. Date: Jan. 7, 2016

(65) Prior Publication Data
US 2017/0155231 A1    Jun. 1, 2017

(30) Foreign Application Priority Data

Jul. 1, 2014   (AU) .................................. 2014902521

(51) Int. Cl.
*H01T 19/04*    (2006.01)
*C01B 13/11*    (2006.01)
*H01T 19/00*    (2006.01)

(52) U.S. Cl.
CPC .............. *H01T 19/04* (2013.01); *C01B 13/11* (2013.01); *H01T 19/00* (2013.01); *C01B 2201/14* (2013.01); *C01B 2201/22* (2013.01); *C01B 2201/24* (2013.01); *C01B 2201/32* (2013.01); *C01B 2201/34* (2013.01); *C01B 2201/62* (2013.01); *C01B 2201/64* (2013.01)

(58) Field of Classification Search
None
See application file for complete search history.

(56) References Cited

U.S. PATENT DOCUMENTS 5,573,733 A    11/1996  Salama
2004/0031676 A1  2/2004  Brauer et al.

FOREIGN PATENT DOCUMENTS

AU    2011203168 A1    7/2011

OTHER PUBLICATIONS

Supplementary European Search Report from European Patent Application No. EP 15 91 5345, dated Feb. 18, 2018, 2 pages.
International Search Report and Written Opinion dated Aug. 26, 2015, in connection with International Patent Application No. PCT/AU2015/050368, 9 pgs.

*Primary Examiner* — Kishor Mayekar
(74) *Attorney, Agent, or Firm* — Chiesa Shahinian & Giantomasi PC

(57) ABSTRACT

A corona discharge apparatus comprising: (a) an elongate inner electrode, (b) an elongate dielectric sleeve mounted on the inner electrode, (c) an elongate outer electrode mounted on the dielectric sleeve, and (d) an ozone-producing region over which the outer electrode extends, the ozone-producing region having an inlet end and an outlet end, the ozone-producing region defined by three sealing members at the inlet end thereof and three sealing members at the outlet end thereof, the sealing members forming a seal between the inner electrode and the dielectric sleeve.

18 Claims, 2 Drawing Sheets

CORONA DISCHARGE CELLS

CROSS-REFERENCE TO RELATED APPLICATIONS

This application is a national stage (under 35 U.S.C. 371) of International Patent Application No. PCT/AU2015/050368, filed Jul. 1, 2015, which claims priority to Australian Patent Application No. 2014902521, filed Jul. 1, 2014, the disclosures of which are herein incorporated by reference in their entirety.

TECHNICAL FIELD

This invention relates to corona discharge cells for generating ozone.

BACKGROUND ART

During the manufacture of ozone by corona discharge, a corona is generated for ozone production by applying an electrical current across two metallic electrodes separated by a dielectric insulator and an air gap.

The electrical current will not arc between the electrodes because of the dielectric and the air gap. Instead, an energized corona develops in the interstitial space between the electrodes, which is characterised by a deep blue or violet glow.

Ozone is produced by passing oxygen or air through this electrical field wherein a certain percentage of the oxygen molecules dissociate then recombine as ozone.

In some environments such as in cool storage rooms for fruit and vegetables having ozone generators the corona discharge process can be adversely affected by moisture and cold.

Corona discharge ozone cells generally provide more constant ozone output than do UV ozone producing lamps.

Ozone producing ultra violet lamps can deteriorate quite quickly with ozone output declining quite rapidly and corona discharge cells are preferable and allow manufacturers to better develop protocols for ozone concentrations for various fruits and vegetables treatments, however, their use is dependent upon the development of corona discharge cells that can withstand the cold and moisture when placed in cool storage environments.

When using the corona discharge ozone generators to produce ozone air in cool, moist environments, suitable cold and moisture resistant electronic equipment is required.

The electronic control board, transformer, connections, etc. all need to be suitably designed and insulated so they will function under these conditions.

The corona cell assembly itself, over which air is blown by the generator fan to generate ozone, has to be cold-resistant and moisture-resistant so that it functions effectively under these conditions and continues to produce adequate levels of ozone.

In addition, when an ozone generator is controlled by a timer or ozone monitor, the entire electrical assembly including the generating cell will become cold during the time the machine is switched off.

The cell needs to respond quickly when the generator is turned on and recover to ensure a normal corona is again established to produce ozone.

Cold adds current load and as a unit warms up condensation will occur on the outer electrode and on any exposed parts of the dielectric to add more current load, as well as providing an opportunity for arcing to occur. If arcing occurs, the cell can break down and fail.

Electricity will follow moisture so any droplets of moisture that form on the outer electrode or dielectric may allow arcing to travel from the outer electrode along the dielectric and try to reach the inner electrode or enclosure wall. If this occurs, a short can occur resulting in the cell breaking down.

Moisture can also be carried by the generator fan and possibly get between the inner electrode and the inside face of the dielectric.

When the dielectric tubing from off-the-shelf is used the inside dimension is not always uniform. The inner electrode also may not be perfectly uniform in its diameter. As a result, minute gaps are possible between these two components when the cylindrical dielectric is placed over the inner electrode. This situation can lead to leakage and cell failure.

When an ozone generator that generates ozone from air is installed in a confined space to either treat the air or a product with ozone, any residual ozone will be drawn through the ozone generator causing corrosion to certain generator components, particularly electronic components, resulting in malfunction and short working life.

One option is to totally enclose the electronic power board within the generator to safeguard it from residual ozone. Other electronic components such as power sockets, fuse holders etc. can be coated with a suitable epoxy to protect them from ozone.

Standard fans have limited ozone resistance. Further, ensuring all generator components are corrosion and ozone resistant 10 can be expensive and render the generator unaffordable.

Additionally when a corona discharge ozone generation cell is used to produce medium to high levels of ozone from air undesirable nitrogen by-products can form which can also affect generator components. This can be more apparent when such a generator is installed in a cold storage room where moisture levels can be high.

It is an object of the present invention to provide a corona discharge apparatus for generating ozone in air which will operate efficiently in dry as well as cold and wet environments.

It will be clearly understood that, if a prior art publication is referred to herein, this reference does not constitute an admission that the publication forms part of the common general knowledge in the art in Australia or in any other country.

SUMMARY OF INVENTION

The present invention is directed to a corona discharge cell, which may at least partially overcome at least one of the abovementioned disadvantages or provide the consumer with a useful or commercial choice.

With the foregoing in view, the present invention in one form, resides broadly in a corona discharge apparatus comprising:
(a) an elongate inner electrode,
(b) an elongate dielectric sleeve mounted on the inner electrode,
(c) an elongate outer electrode mounted on the dielectric sleeve, and
(d) at least a pair of spaced sealing members between the inner electrode and the dielectric sleeve which define an ozone-producing region over which the outer electrode extends, the ozone-producing region having an inlet end and an outlet end, wherein an outer surface of the inner electrode located within the ozone-producing region is substantially smooth.

In another aspect, the invention resides broadly in a corona discharge apparatus comprising:
(a) an elongate inner electrode,
(b) an elongate dielectric sleeve mounted on the inner electrode,
(c) an elongate outer electrode mounted on the dielectric sleeve, and
(d) an ozone-producing region over which the outer electrode extends, the ozone-producing region having an inlet end and an outlet end, the ozone-producing region defined by three sealing members at the inlet end thereof and three sealing members at the outlet end thereof, the sealing members forming a seal between the inner electrode and the dielectric sleeve.

In another aspect, the invention resides broadly in an electrode for a corona discharge apparatus, the electrode being elongate and having an inlet end and an outlet end, wherein one or more grooves are provided in an outer surface of the electrode towards the outlet end thereof, and wherein, in use, the one or more grooves define a reaction zone.

In a preferred embodiment of the invention, the electrode comprises an inner electrode of the corona discharge apparatus.

In a preferred embodiment, the inner electrode may be provided with one or more grooves in an outer surface thereof towards the outlet end of the ozone-producing region, the one or more grooves defining a reaction zone.

The inner electrode may be of any suitable form. In a preferred embodiment of the invention, however, the inner electrode may comprise a bar or rod. The inner electrode may be fabricated from any suitable material, although in a preferred embodiment of the invention the inner electrode may be fabricated from metal, such as, but not limited to, aluminium, iron, mild steel, stainless steel, copper, silver, gold, aluminium or any suitable metal alloy. Preferably, the inner electrode is substantially circular in cross-section, although it will be understood that other cross-sectional shapes could also be used.

In a preferred embodiment, the inner electrode may comprise at least one bore extending along at least a portion of the length of the inner electrode. Preferably the at least one bore extends from an inlet end of the inner electrode along at least a portion of the length of the inner electrode. The bore may extend to an outlet end of the inner electrode located at the opposite end of the inner electrode to the inlet end, or may terminate at a point between the inlet and outlet ends of the inner electrode.

It is envisaged that one or more entry apertures may be provided in the inner electrode to allow fluid passing through the bore to exit the bore through the one or more entry apertures. In a preferred embodiment of the invention, the one or more entry apertures may be located towards the inlet end of the ozone-producing region of the apparatus such that fluid exiting the bore through the one or more entry apertures enters the ozone-producing region.

Preferably, the inner electrode is further provided with one or more exit apertures. In this embodiment of the invention, the one or more exit apertures may be located within the ozone-producing region (preferably, towards the outlet end thereof) and may be adapted to provide a route for fluid entering the ozone-producing region through the entry apertures to exit the ozone-producing region.

The one or more exit apertures may be in fluid communication with the bore. In this way, at least a portion of the fluid flowing through the bore may enter the ozone-producing region through the entry apertures, then be received again in the bore after exiting the ozone-producing region through the exit apertures.

Alternatively, the inner electrode may comprise two bores. In this embodiment of the invention, a first bore may extend from the inlet end of the inner electrode and terminate at the entry apertures. A second bore may extend from the outlet end of the inner electrode and terminate at the exit apertures. In this embodiment, substantially all of the fluid passing through the first bore is directed into the ozone-producing region.

The bore (or bores) may be aligned in any suitable manner within the inner electrode. Preferably, however, the bore (or bores) are located substantially co-axially with a central longitudinal axis of the inner electrode. It will be understood however, that the diameter and shape of the bore(s) and the entry and exit apertures are not critical, and may be varied as required. In some embodiments of the invention the bore, or at least one bore when more than one bore is present, may be capable of being sealed off or capped if required.

The sealing members may be located on the outer surface of the inner electrode. In some embodiments, however, the inner electrode may be provided with one or more receiving portions for at least partially receiving the sealing members. Preferably, the inner electrode may be provided with at least a pair of receiving portions, wherein a first receiving portion is located towards the inlet end of the inner electrode, and a second receiving portion is located towards the outlet end of the inner electrode. It is envisaged that the first and second receiving portions may define opposed ends of the ozone-producing region.

In a preferred embodiment of the invention, each receiving portion may comprise a groove, channel, recess, depression or the like (hereinafter referred to collectively as "grooves") in the outer surface of the inner electrode. Preferably, the grooves comprise circumferential grooves that extend about the entire circumference of the inner electrode.

In some embodiments, the outer surface of the inner electrode located outside the ozone-producing region may be provided with a cooling portion adapted to dissipate heat generated in the ozone-producing region. Any suitable cooling portion may be provided, such as, but not limited to, one or more projections (such as fins). The fins may extend outwardly from the surface of the inner electrode or may be created by threads or fluting in the surface of the inner electrode.

In some embodiments of the invention, the outer surface of the inner electrode located within the ozone-producing may be substantially smooth. In other embodiments, however, at least a portion of the outer surface of the inner electrode located in the ozone-producing region may be provided with a plurality of regions of elevated height relative to the surface level of the outer surface of the inner electrode within the ozone-producing region. In any event, the portion of the outer surface of the inner electrode at which the production of ozone occurs (whether smooth or provided with regions of elevated height) may be referred to as the reaction surface.

The regions of elevated height may be of any suitable form. For instance, the regions of elevated height may comprise a plurality of relatively large regions of elevated height. These relatively large regions may have a substantially planar surface or may have an uneven surface. More preferably, however, the regions of elevated height may comprise a plurality of peaks. In this embodiment, the plurality of peaks may be separated from one another by a plurality of troughs. In some embodiments of the invention, a combination of relatively large regions of elevated height and peaks may be provided.

In a most preferred embodiment of the invention, the regions of elevated height comprise a plurality of relatively sharp peaks having a tip at the apex of the peak.

The regions of elevated height may all have substantially the same height, or the height of the regions of elevated height may vary. In a preferred embodiment of the invention, however, the diameter of the inner electrode in the regions of elevated height is less than the inner diameter of the dielectric sleeve, meaning that a gap exists between the regions of elevated height and the inner surface of the dielectric sleeve. The exact dimensions of the gap are not critical, and it will be understood that the dimensions of the gap may vary as required.

It is envisaged that the troughs separating the peaks in the ozone-producing region may all be positioned at the same level as one another. Thus, while it is possible that the height of the peaks may vary, the surface level at the bottom of each trough will be substantially identical throughout the ozone-producing region.

In embodiments of the invention in which the regions of elevated height comprise a plurality of peaks, it is envisaged that sparking in the ozone-producing region during use of the apparatus will occur at the peaks. This results in even sparking within the ozone-producing region. In addition, the presence of regions of elevated height prevents or reduces sparks contacting the lower regions of the outer surface of the inner electrode. Sparks contacting the lower regions can lead to holes being burnt through the surface of the inner electrode, leading to reduced efficiency of operation.

The regions of elevated height may be formed using any suitable technique. For instance, the plurality of regions of elevated height may be formed separately from the inner electrode and adapted for attachment thereto. Alternatively, the inner electrode may be formed so that a region of increased diameter is present in the ozone-producing region. In some embodiments of the invention, the inner electrode may be formed using a process whereby the regions of elevated height are formed during the forming process (such as casting). Alternatively, the inner electrode may be formed with a thickened portion in the ozone-producing region and may be machined, heat treated or chemically treated (such as with a corrosive or caustic substance) to remove some of the material in the thickened portion so as to form the regions of elevated height. The removal of material from the thickened portion may be achieved using any suitable technique, such as multistart threading.

Any suitable sealing members may be used in the present invention. Preferably, however, the sealing members are fabricated from resiliently deformable material so that an effective seal may be formed between the inner electrode and the dielectric sleeve. Thus, in some embodiments of the invention, the sealing members may be fabricated from rubber, resiliently deformable plastic or the like. In other embodiments, the sealing members may be at least partially fabricated from ozone resistant material. Any suitable ozone resistant material may be used, such as, but not limited to, Viton, silicone or the like, or a combination thereof. In a most preferred embodiment of the invention, the sealing members comprise o-rings.

Preferably, at least one sealing member is located in each receiving portion. More preferably, however, at least a pair of sealing members is located in each receiving portion. While previously it has been thought that more than one sealing member at each end of an inner electrode would be sufficient, it has been found that providing at least a pair of sealing members at each end of the inner electrode assists in providing an improved seal between the inner electrode and the dielectric sleeve. More preferably, it has been found that providing three sealing members at each end of the inner electrode assists in proving an improved seal between the inner electrode and the dielectric sleeve. This is because sealing members such as o-rings are not necessarily formed so as to be perfectly round, elliptical, oval and so on. Instead, there may be slight differences in the thickness of an o-ring at different points around its circumference. These differences in thickness may lead to an imperfect seal between the inner electrode and the dielectric sleeve. However, it has now been found that, by providing at least a pair of sealing members at each end of the ozone-generating region, these differences in thickness may be compensated for by the presence of second and third sealing members, thereby improving the seal between the inner electrode and the dielectric sleeve.

In addition, the presence of at least two, and preferably three, sealing members assists in maintaining a substantially constant distance between the inner electrode and the dielectric sleeve in the ozone-producing region about the entire circumference of the inner electrode. This improved seal and constant distance between the inner electrode and the dielectric sleeve results in more even sparking in the ozone-producing region during use of the apparatus, and prevents the formation of "hot spots" on the surface of the inner electrode. These "hot spots" form when the distance between the dielectric sleeve and the inner electrode is smaller at a particular area than elsewhere in the ozone-producing region, meaning that sparks form more readily in these areas. The formation of "hot spots" can lead to damage (in the form of erosion) to the surface of the inner electrode.

In some embodiments of the invention, the inner electrode may be provided with one or more shoulder portions adjacent the sealing members and between the sealing members and the respective end of the inner electrode. The shoulder portions may be located outside of the dielectric sleeve or may be housed at least partially within the dielectric sleeve. The shoulder portions may extend along any suitable length of the inner electrode. It is envisaged that the shoulder portion will be sized so as to have a diameter that is approximately the same as the inner diameter of the dielectric sleeve. In this way, the loss through leakage of ozone from the ozone-producing region past the shoulder portions may be reduced or eliminated. In some embodiments of the invention, the height of the plurality of peaks in the ozone-producing region above the surface level at the bottom of the troughs may be similar to, or slightly less than, the height of the shoulder portions above the surface level at the bottom of the troughs.

As previously stated, the inner electrode is provided with one or more grooves in an outer surface thereof towards the outlet end of the ozone-producing region, the one or more grooves defining a reaction zone. In a preferred embodiment of the invention, the one or more grooves may be located adjacent the exit apertures in the ozone-producing region. More preferably, the one or more grooves may be located between the reaction surface of the inner electrode and the exit apertures. In this way fluid enters the reaction zone formed by the one or more grooves after having passed over the reaction surface from the entry apertures and just prior to exiting the ozone-producing region.

In a preferred embodiment of the invention, the one or more grooves extend substantially about the circumference of the inner electrode to form circumferential grooves. Any suitable number of grooves may be present, although in a preferred embodiment of the invention, at least two grooves may be present, and more preferably three grooves may be present.

Preferably, the grooves extend inwardly into the outer surface of the inner electrode. Thus, it is envisaged that the grooves extend into the outer surface of the inner electrode to a level below the surface level at the bottom of the troughs in the ozone-producing region. The one or more grooves may extend to any suitable depth below the surface level. Further, the grooves may be provided with any suitable shape. For instance, the grooves may comprise substantially square channels or may be U- or V-shaped. The grooves may be formed in the outer surface of the inner electrode using any suitable technique. For instance, the inner electrode may be cast with the grooves formed therein, or the grooves may be milled into the surface of the inner electrode.

In a preferred embodiment of the invention, the upper portion of the grooves is located substantially level with the surface level of the reaction surface (i.e. the level of the troughs in the ozone-producing region). Thus, it is envisaged that substantially all of the grooves will be located at a level below the surface level of the troughs in the ozone-producing region.

The purpose of the presence of the one or more grooves is to create a reaction zone in which fluid leaving the ozone-producing region is subjected to a further reaction prior to leaving the ozone-producing region through the exit apertures. This assists in the production of a more refined ozone stream leaving the ozone-producing region as well as preventing the fluid exiting the ozone-producing region forming a relatively fast-flowing stream that passes through and exits the ozone-producing region without having an opportunity to fully react. By providing the one or more grooves, not only is a reaction zone formed, but mixing of the fluid leaving the ozone-producing region is promoted, thereby reducing the likelihood of fluid leaving the ozone-producing region without sufficient residence time in the ozone-producing region to result in a satisfactory degree of reaction.

It is envisaged that, when functioning correctly, a corona discharge may be present in the reaction zone during use of the apparatus.

Any suitable dielectric sleeve may be used. Preferably, however, the dielectric sleeve comprises a tubular member that is mounted to the inner electrode. Typically, the dielectric sleeve may be mounted to the inner electrode by housing at least a portion of the inner electrode within the dielectric sleeve. Thus, it is envisaged that the diameter of the dielectric sleeve will be greater than the diameter of the inner electrode. The dielectric sleeve may have any suitable cross-sectional shape. However, it is preferable that the cross-sectional shape of the dielectric sleeve is substantially the same as that of the inner electrode such that an effective seal may be formed between the inner electrode and the dielectric sleeve.

The dielectric sleeve may be fabricated from any suitable dielectric material. For instance, the dielectric sleeve may be fabricated from ceramic, quartz, plastic, glass or a combination thereof. In a specific embodiment of the present invention, the dielectric sleeve may be fabricated from borosilicate glass (Pyrex). In some embodiments of the invention, the dielectric sleeve may be open a first end thereof and closed at a second end thereof (for instance, by crimping).

In some embodiments of the invention, the inner surface of the dielectric sleeve may be provided with one or more grooves, channels, recesses, depressions or the like (hereinafter referred to collectively as "grooves") that, when the apparatus is assembled, substantially align with the receiving portions on the inner electrode. In this way, the sealing members may be at least partially received in the grooves on the inner surface of the dielectric sleeve so as to provide improved sealing between the dielectric sleeve and the inner electrode.

When the apparatus is assembled, a sealant may be used to form a seal between the inner electrode and the dielectric sleeve. The sealant may be inserted into the receiving portions, or may be provided between the shoulder portions and the dielectric sleeve. Any suitable sealant may be used, such as, but not limited to, a silicone based sealant. Preferably, the sealant may be applied to both ends of the ozone-producing region. In this way, if the sealing members ever degrade due to contact with ozone, the sealant will maintain a seal between the inner electrode and the dielectric sleeve.

In some embodiments of the invention, the length of the inner electrode may be extended allowing for a screw-threaded section to be located at one or both ends of the inner electrode. The screw-threaded section may then be used to attach a complementary screw-threaded portion of, for instance, a hose or duct through which fluid is supplied to the apparatus. The screw-threaded portion may be provided with an internal screw thread or an external screw thread.

The fluid may be of any suitable form, such as a gas, liquid, or combination of the two. However, in a preferred embodiment of the invention, the fluid comprises an oxygen-containing fluid. In a more preferred embodiment of the invention, the fluid comprises an oxygen-containing gas (such as air). Most preferably, the fluid comprises oxygen gas. The fluid may be pumped or sucked through the apparatus using any suitable technique.

The apparatus may be powered using any power source, such as mains power, a generator, one or more batteries or the like, or a combination thereof. In a preferred embodiment of the invention, the apparatus may be powered with the assistance of a control board associated with a transformer.

The outer electrode may be of any suitable form. Preferably, however, the outer electrode is fabricated from a conductive material. Any suitable conductive material may be used, although it is preferred that the conductive material is metal. The metal used may be iron, mild steel, stainless steel, copper, silver, gold, aluminium or the like, or any suitable alloy of conductive metal. In some embodiments of the invention, the outer electrode may comprise a tubular rod or bar. Alternatively, the outer electrode may be formed from sheet material (such as steel sheet or aluminium foil) and formed into a tubular shape.

In some embodiments, the outer electrode may be formed by crimping free ends of sheet or foil material, and then tensioning the material using an angle shaped member (preferably a metal member) which is collapsed so that the free end of the member grips the free ends of the sheet material to apply a uniform tension to the sheet material. The member may then provide means for attaching a power supply.

Thus, in a preferred embodiment of the invention, the outer electrode comprises a power connection portion adapted to allow a power source to be connected thereto.

The outer electrode may be of any suitable size, shape or configuration. Preferably, however, the outer electrode comprises a tubular member that is mounted to the dielectric sleeve. Typically, the outer electrode may be mounted to the dielectric sleeve by housing at least a portion of the dielectric sleeve within the outer electrode. Thus, it is envisaged that the diameter of the outer electrode will be greater than the diameter of the dielectric sleeve. The outer electrode may have any suitable cross-sectional shape. However, it is preferable that the cross-sectional shape of the outer electrode is substantially the same as that of the dielectric sleeve.

In a preferred embodiment of the invention, the outer electrode may be retained in place relative to the dielectric sleeve. This may be achieved using any suitable technique. For instance, the outer electrode may be attached to the dielectric sleeve using one or more mechanical fasteners, adhesives or the like, or any suitable combination thereof. Preferably, however, one or more bands, ties, rings (hereinafter referred to collectively as "rings") or the like may be used to secure the outer electrode to the dielectric sleeve. The rings (which can include o-rings) are preferably fabricated from an ozone-resistant material so as to avoid or reduce the effect of degradation over time with exposure to ozone.

In some embodiments, at least a portion of the inner surface of the outer electrode may be roughened so as to increase the surface area thereof. The inner surface may be roughened using any suitable technique, such as, but not limited to, knurling, chip forming, multistart threads, or the like, or a combination thereof.

In another aspect, the invention resides broadly in a method for generating ozone in a controlled environment comprising the steps of positioning a corona discharges apparatus according to the present invention within the controlled environment and providing a connecting power source for the apparatus in a position remote from the controlled environment.

It is envisaged that the apparatus may be used for providing ozone in water treatment systems. However, it may also be used to provide ozone for air treatment. When used for air treatment, the fluid is pushed through the apparatus and the produced airborne ozone may be simply ducted into the space to be treated.

In water treatment, it is envisaged that, typically, a venturi may be used to draw the fluid through the apparatus to generate ozone. The ozone may then be injected into the water stream.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DESCRIPTION OF EMBODIMENTS

Figure 1:
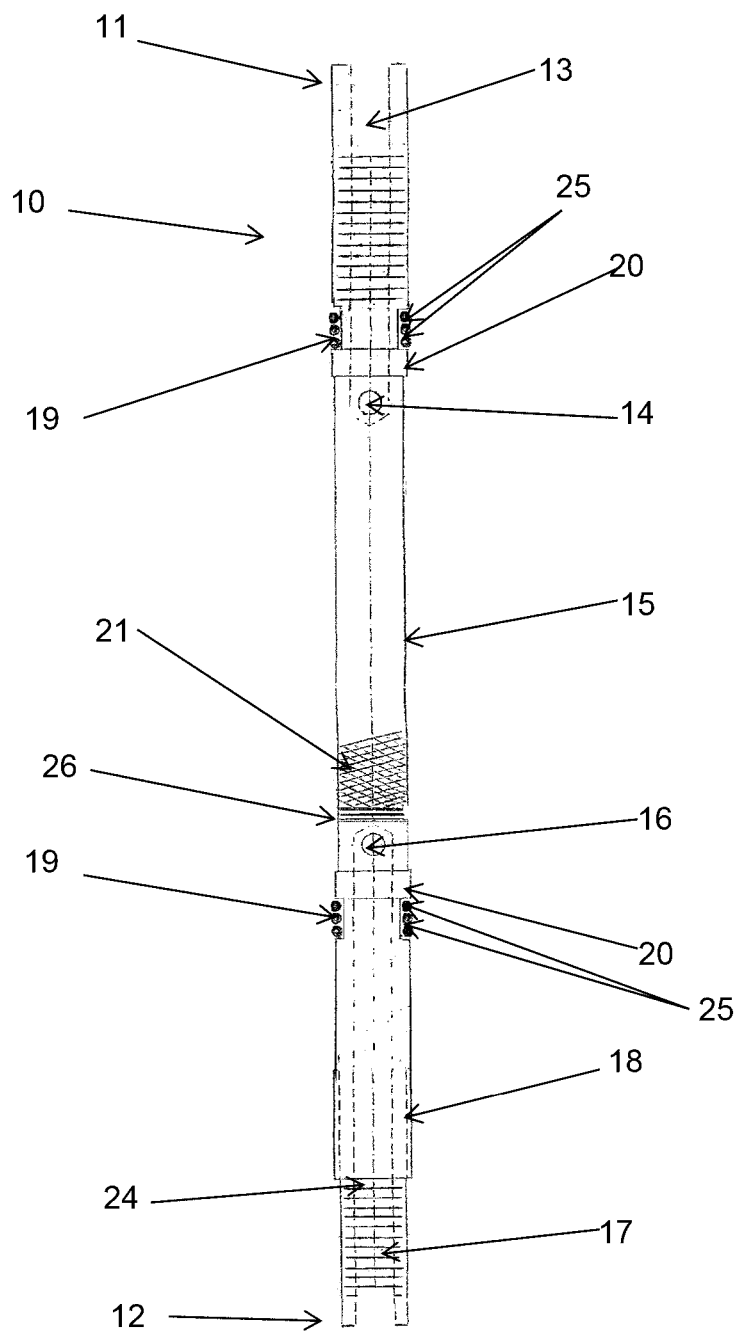
FIG. 1 illustrates a side view of an inner electrode of a corona discharge apparatus according to an embodiment of the present invention.

In FIG. 1 there is illustrated a side view of an inner electrode 10 of a corona discharge apparatus according to an embodiment of the present invention. The inner electrode comprises a first (inlet) end 11 and a second (outlet) end 12 located at an opposite end of the inner electrode 10 to the first end 11. A first bore 13 extends into the electrode 10 from the first end 11 thereof. The first bore 13 terminates in an entry aperture 14 that allows fluid (typically oxygen) flowing through the first bore 13 to be released into an ozone-producing region 15 of the assembled corona discharges apparatus. Ozone produced in the ozone-producing region 15 (and any unreacted oxygen) exits the ozone-producing region 15 through an exit aperture 16 and enters a second bore 17 that extends inwardly into the electrode 10 from the second end 12 thereof.

The bores 13, 17 are arranged so as to be substantially co-axial with the longitudinal axis 24 of the electrode 10.

In the embodiment of the invention shown in FIG. 1, the electrode 10 includes an externally screw-threaded portion 18 at one end thereof, the screw-threaded portion 18 being adapted to screw-threadedly engage with a support element, such as a wall (not shown).

The electrode 10 is provided with a pair of receiving portions 19, with one of the pair of receiving portions 19 being located on either side of the ozone-producing region 15. In use, sealing members in the form of three o-rings 25 are located in each of the receiving portions 19 in order to create a seal between the inner electrode 10 and a dielectric sleeve (not shown).

Adjacent the receiving portions 19 (and located between the receiving portions 19 and the respective ends 11, 12 of the electrode 10) are shoulder portions 20. The shoulder portions 20 comprise thickened portions that are adapted to be aligned with the end of the dielectric sleeve (not shown) or be housed at least partially within the dielectric sleeve (not shown). The shoulder portions 20 provide an additional seal between the inner electrode 10 and the dielectric sleeve (not shown) so as to prevent or reduce the escape of oxygen or ozone from the ozone-producing region 15.

Figure 2:
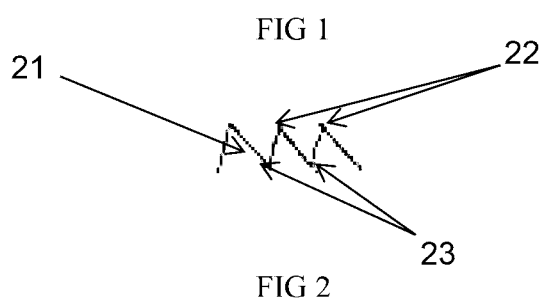
FIG. 2 illustrates a detailed view of a portion of the outer surface of the inner electrode of a corona discharge apparatus according to an embodiment of the present invention.

The outer surface of the inner electrode 10 located in the ozone-producing region 15 (i.e. the reaction surface) is provided with a plurality of regions of elevated height 21 relative to the remainder of the inner electrode 10. In the embodiment of the invention shown in the Figures, the regions of elevated height 21 comprise a series of sharp peaks 22 separated by troughs 23 as illustrated in FIG. 2. During use, sparking occurs at the peaks 22, providing even sparking and preventing holes being burnt in the surface of the inner electrode 10. The level of the troughs 23 shown in FIG. 2 is the surface level of the inner electrode 10, meaning that the peaks 22 extend outwardly from the surface of the inner electrode 10 in the ozone-producing region 15.

It will be understood that in FIG. 1, although not illustrated in this manner, the regions of elevated height 21 extend substantially the entirely length of the ozone-producing region 15 from the entry aperture 14 to the reaction zone 26.

In FIG. 1, the reaction zone 26 comprises three circumferential grooves or channels 27 that extend entirely about the circumference of the inner electrode 10. The grooves 27 extend inwardly into the surface of the inner electrode 10 such that the open upper end of the grooves 27 is level with the troughs 23 (i.e. level with the surface level of the inner electrode 10 in the ozone-producing region 15). This situation is best illustrated in FIG. 3, in which the grooves 27 may be seen extending into the surface of the inner electrode 10 from the same level as the troughs 23 with the peaks 22 extending outwardly from the surface of the inner electrode 10.

Figure 3:
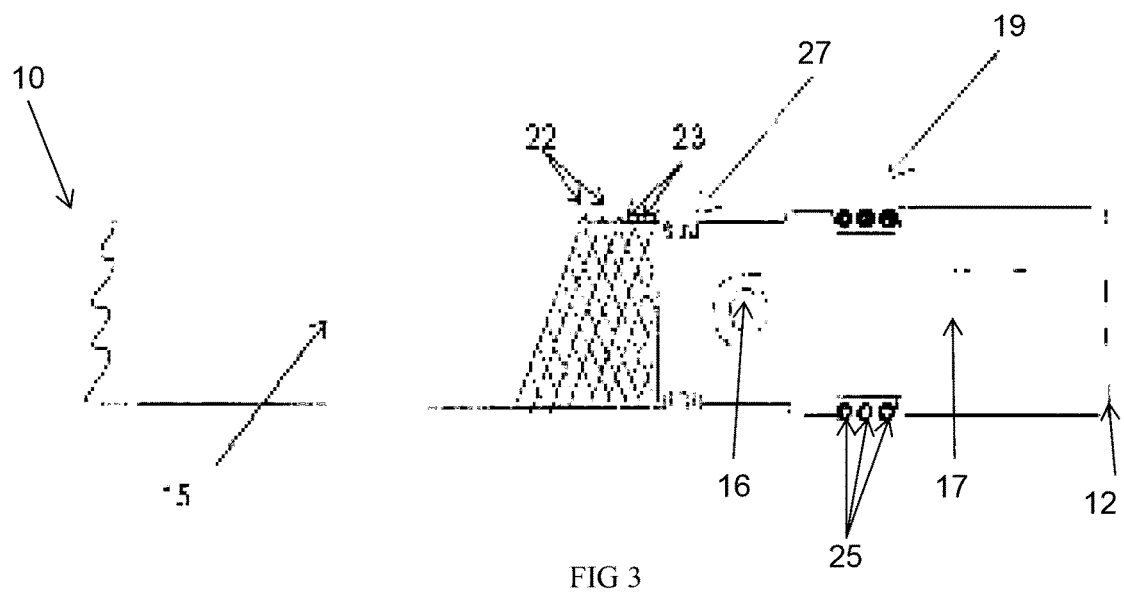
FIG. 3 illustrates a detailed view of an inner electrode of a corona discharges apparatus according to an embodiment of the present invention.

FIG. 3 further illustrates that the grooves 27 are located between the ozone-producing region 15 and the exit aperture 16 that communicates with second bore 17.

In use, the reaction zone located at the grooves 27 emits a halo that forms a curtain and ensures that gas flowing through the ozone-producing region 15 is subject to mixing and further reaction prior to leaving through the exit aperture 16. The presence of the reaction zone also assists in equalising the flow of gas through the ozone-producing region 15, and reduces or prevents the preferential flow of gas through portions of the ozone-producing region 15. In turn, this assists in improving the efficiency of the reaction in the ozone-producing region 15.

Located between the exit end 12 of the electrode 10 and the exit aperture 16 are sealing members in the form of three o-rings 25 that are positioned in a receiving portion 19 and form a seal between the inner electrode 10 and the dielectric sleeve (not shown). The presence of the three o-rings 25 ensures that the gap between the electrode 10 and the dielectric sleeve (not shown) is substantially constant about the entire circumference of the ozone-producing region 15. Because the o-rings may not be perfectly circular in shape, the presence of fewer than three o-rings may lead to the distance between the electrode 10 and the dielectric sleeve (not shown) not being constant about the entire circumference of the ozone-producing region 15. In this situation, sparking will preferentially occur in the parts of the ozone-producing region 15 where the distance between the dielectric sleeve (not shown) and the electrode 10 is the shortest. This leads to uneven and inefficient sparking (and therefore ozone production), and can also lead to damage (through erosion) to the surface of the electrode 10.

Figure 4:
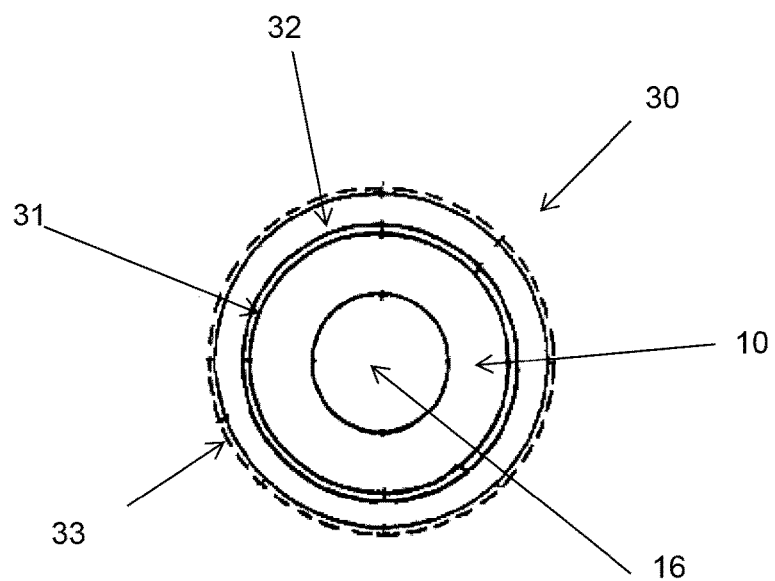
FIG. 4 illustrates a cross-sectional view of a corona discharge apparatus according to an embodiment of the present invention.

In FIG. 4 there is illustrated a cross-sectional view of a corona discharge apparatus 30 according to an embodiment of the present invention. The apparatus 30 comprises an inner electrode 10 having a bore 16 extending into the electrode 10 through which a fluid flows during use.

The fluid exits the bore 16 through an aperture (not shown) and enters an ozone-producing region (not shown) that is located in an air gap 31 between the outer surface of the inner electrode 10 and the inner surface of the dielectric sleeve 32 which is a tubular hollow member.

An outer electrode 33 is located over the dielectric sleeve 32. The outer electrode 33 is a tubular material, possibly mesh or metal sheet (which may be coated).

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A corona discharge apparatus comprising:
    (a) an elongate inner electrode,
    (b) an elongate dielectric sleeve mounted on the inner electrode,
    (c) an elongate outer electrode mounted on the dielectric sleeve, and
    (d) an ozone-producing region over which the outer electrode extends, the ozone-producing region having an inlet end and an outlet end, the ozone-producing region defined by three sealing members at the inlet end thereof and three sealing members at the outlet end thereof, the sealing members forming a seal between the inner electrode and the dielectric sleeve, wherein an outer surface of the inner electrode within the ozone-producing region is smooth.

2. The corona discharge apparatus according to claim 1 wherein the inner electrode is provided with one or more grooves in an outer surface thereof towards the outlet end of the ozone-producing region, the one or more grooves defining a reaction zone.

3. The corona discharge apparatus according to claim 1 wherein the inner electrode comprises at least one bore extending along at least a portion of a length of the inner electrode.

4. The corona discharge apparatus according to claim 3 wherein the at least one bore extends from an inlet end of the inner electrode along the at least the portion of the length of the inner electrode.

5. The corona discharge apparatus according to claim 3 wherein the inner electrode is provided with one or more entry apertures to allow fluid passing through the at least one bore to exit the at least one bore through the one or more entry apertures.

6. The corona discharge apparatus according to claim 5 wherein the one or more entry apertures are located toward the inlet end of the ozone-producing region such that fluid exiting the at least one bore through the one or more entry apertures enters the ozone-producing region.

7. The corona discharge apparatus according to claim 5 wherein the inner electrode is provided with one or more exit apertures located toward the outlet end of the ozone-producing region.

8. The corona discharge apparatus according to claim 7 wherein the inner electrode includes a second bore extending from the outlet end of the inner electrode and terminating at the exit apertures.

9. The corona discharge apparatus according to claim 1 wherein the sealing members are located on an outer surface of the inner electrode.

10. The corona discharge apparatus according to claim 9 wherein the outer surface of the inner electrode is provided with one or more receiving portions for at least partially receiving the sealing members.

11. The corona discharge apparatus according to claim 1 wherein an outer surface of the inner electrode is provided with a cooling portion adapted to dissipate heat generated in the ozone-producing region.

12. The corona discharge apparatus according to claim 1 wherein an outer surface of the inner electrode in the ozone-producing region is provided with a plurality of regions of elevated height.

13. The corona discharge apparatus according to claim 12 wherein the regions of elevated height comprise a plurality of relatively sharp peaks having a tip at an apex of the peak.

14. The corona discharge apparatus according to claim 1 wherein the inner electrode is provided with one or more shoulder portions adjacent the sealing members and between the sealing members and a respective end of the inner electrode.

15. The corona discharge apparatus according to claim 1 wherein the dielectric sleeve is fabricated from borosilicate glass.

16. The corona discharge apparatus according to claim 1 wherein the dielectric sleeve includes one or more grooves on an inner surface thereof, the one or more grooves adapted to at least partially receive the sealing members.

17. The corona discharge apparatus according to claim 1 wherein the outer electrode is fabricated from a conductive material.

18. A method for generating ozone in a controlled environment comprising the steps of:
positioning a corona discharge apparatus within the controlled environment, the corona discharge apparatus comprising: an elongate inner electrode,
an elongate dielectric sleeve mounted on the inner electrode, an elongate outer electrode mounted on the dielectric sleeve, and an ozone-producing region over which the outer electrode extends, the ozone-producing region having an inlet end and an outlet end, the ozone-producing region defined by three sealing members at the inlet end thereof and three sealing members at the outlet end thereof, the sealing members forming a seal between the inner electrode and the dielectric sleeve, wherein an outer surface of the inner electrode within the ozone-producing region is smooth; and
providing a connecting power source for the corona discharge apparatus in a position remote from the controlled environment.

* * * * *